(12) United States Patent
Ramkumar

(10) Patent No.: US 9,386,253 B2
(45) Date of Patent: Jul. 5, 2016

(54) ELECTRONIC TELEVISION COMPRISING MOBILE PHONE APPARATUS

(71) Applicant: Somasundaram Ramkumar, Tamil Nadu (IN)

(72) Inventor: Somasundaram Ramkumar, Tamil Nadu (IN)

( * ) Notice: Subject to any disclaimer, the term of this patent is extended or adjusted under 35 U.S.C. 154(b) by 142 days.

(21) Appl. No.: 14/463,024

(22) Filed: Aug. 19, 2014

(65) Prior Publication Data

US 2015/0049159 A1 Feb. 19, 2015

Related U.S. Application Data

(60) Provisional application No. 61/867,368, filed on Aug. 19, 2013.

(51) Int. Cl.
*H04H 60/09* (2008.01)
*H04N 5/44* (2011.01)
*H04N 21/41* (2011.01)
*H04N 21/414* (2011.01)
*H04N 21/462* (2011.01)
*H04N 21/488* (2011.01)

(52) U.S. Cl.
CPC ............. *H04N 5/44* (2013.01); *H04N 21/4122* (2013.01); *H04N 21/4126* (2013.01); *H04N 21/41407* (2013.01); *H04N 21/4622* (2013.01); *H04N 21/488* (2013.01)

(58) Field of Classification Search
CPC .......... H04N 21/4122; H04N 21/4126; H04N 21/41407; H04N 21/4622; H04N 5/44; H04W 4/02; H04W 4/06; H04W 92/18
See application file for complete search history.

*Primary Examiner* — Shaima Q Aminzay
(74) *Attorney, Agent, or Firm* — King & Schickli, PLLC

(57) ABSTRACT

A LCD television, LED television, Plasma television or other television system comprising a mobile phone having one or plurality of simsocket containing a plurality of pins, wherein Input/Output pin, clock pin, reset pin, vcc pin, ground pin are several respective pins of the said simsocket, and the said pins of one or plurality of simsocket are connected in parallel and the said plurality of simsockets for accepting plurality of simcards in order to operate the simcards selectively and/or simultaneously. The said plurality of simsocket are connected to the CPU (Central Processing Unit) (14) in parallel and the said CPU (14) has a switching circuit and the said CPU (14) is connected to the one or plurality of simsocket through the switching circuit and the function of one or plurality of simsocket is operated by the CPU (14), switching circuit, and transreceivers (15). The function of the television and the mobile phone is operated selectively and/or simultaneously by the CPU (14), switching circuit, and transreceivers (15), and the said CPU (14) is connected to the transreceivers (15) through antenna (16) in the LCD television, LED television, Plasma television and other television system.

10 Claims, 7 Drawing Sheets

ELECTRONIC TELEVISION COMPRISING MOBILE PHONE APPARATUS

This application claims priority to U.S. Provisional Patent Application Ser. No. 61/867,368, filed Aug. 19, 2013, the disclosure of which is incorporated by reference.

TECHNICAL FIELD

This disclosure relates generally to televisions, and in particular to a television adapted for mobile phone functionality.

BACKGROUND OF THE INVENTION

The use of mobile phones has become ubiquitous, although the display screens associated with said phones are relatively small and viewing of said display screens has generally been limited to visualization of the telephone device itself. At the same time, televisions are widely utilized for entertainment purposes, and for viewing a variety of forms of media.

The current invention addresses the features of a telephone and a television in an effort to streamline a user's enjoyment of both devices. The function of the television and the mobile phone may be operated selectively and/or simultaneously by the CPU (14), switching circuit, and transreceivers (15), and the said CPU (14) may be connected to the transreceivers (15) through antenna (16) in the LCD television, LED television, Plasma television and other television system.

SUMMARY OF THE INVENTION

The invention relates to LCD televisions, LED televisions, Plasma televisions and other television systems in particular. The object of the invention is a LCD television, LED television, Plasma television or other television system comprising a mobile phone, which may have one or a plurality of simsockets. The simsockets may contain a plurality of pins wherein an Input/Output pin, clock pin, reset pin, Vcc pin, or ground pin may be included in the respective pins of the said simsocket. The said pins of the one or plurality of simsockets may be connected in parallel and the said plurality of simsocket may be adapted for accepting a plurality of simcards in order to operate selectively and/or simultaneously. The said plurality of simsocket may be connected to a CPU (Central Processing Unit) (14), and said simsockets may be connected in parallel. The said CPU (14) may have a switching circuit and may be connected to the one or plurality of simsocket through the switching circuit. The function of one or plurality of simsocket may be operated by the CPU (14), switching circuit, and/or transreceivers (15). The circuitry of the LCD television, LED television, Plasma television or other television system may be modified in order to accommodate utilization of one simsocket or a plurality of simsockets for accepting one simcard or a plurality of simcards, which can transreceive to and/or from the mobile towers. Functions of television and the mobile phone may be operated selectively and/or simultaneously by the CPU (Central Processing Unit) (14), switching circuit, and/or transreceivers (15). The CPU (14) may be connected to the transreceivers (15) through antenna (16) in the LCD television, LED television, Plasma television and other television system such that some or all of the features of mobile phone can operated by CPU (Central Processing Unit) in the LCD television, LED television, Plasma television and other television system. The said features of the mobile phone may be one or a plurality of simsocket, keyboard and/or Virtual Keyboard, Display screen, transreceivers, video, audio, bluetooth, radio, camera, speakers, memory socket, fax, audio call, video call, WAP, Wi-Fi, Wi-Fi Hotspot, GPRS and so on. These features can be operated by the CPU (Central Processing Unit) (14) in the LCD television, LED television, Plasma television and other television system. The said CPU (14) can include a plurality of CPU (14) in the LCD television, LED television, Plasma television and other television system. The power supply required to operate the mobile phone may be obtained from a battery and/or external power supply in the LCD television, LED television, Plasma television and other television system.

The said mobile phone may be adapted to operation on a GSM, CDMA or other radio system network. In addition, the said mobile phone may operate on any generation network, including 2G (Second Generation), 3G (Third Generation), 4G (Fourth Generation), 5G (Fifth Generation), 6G (Sixth Generation) and so on. In order to incorporate this principle there is a need for technological changes in the existing LCD television, LED television, Plasma television and other television system. Therefore the entire circuitry of the known LCD television, LED television, Plasma television and other television system may be changed to account for the present invention.

BRIEF DESCRIPTION OF THE DRAWINGS

The salient features of the invention are described in detail with reference to various figures showing essential aspects of the invention.

DETAILED DESCRIPTION OF THE INVENTION

Figure 1:
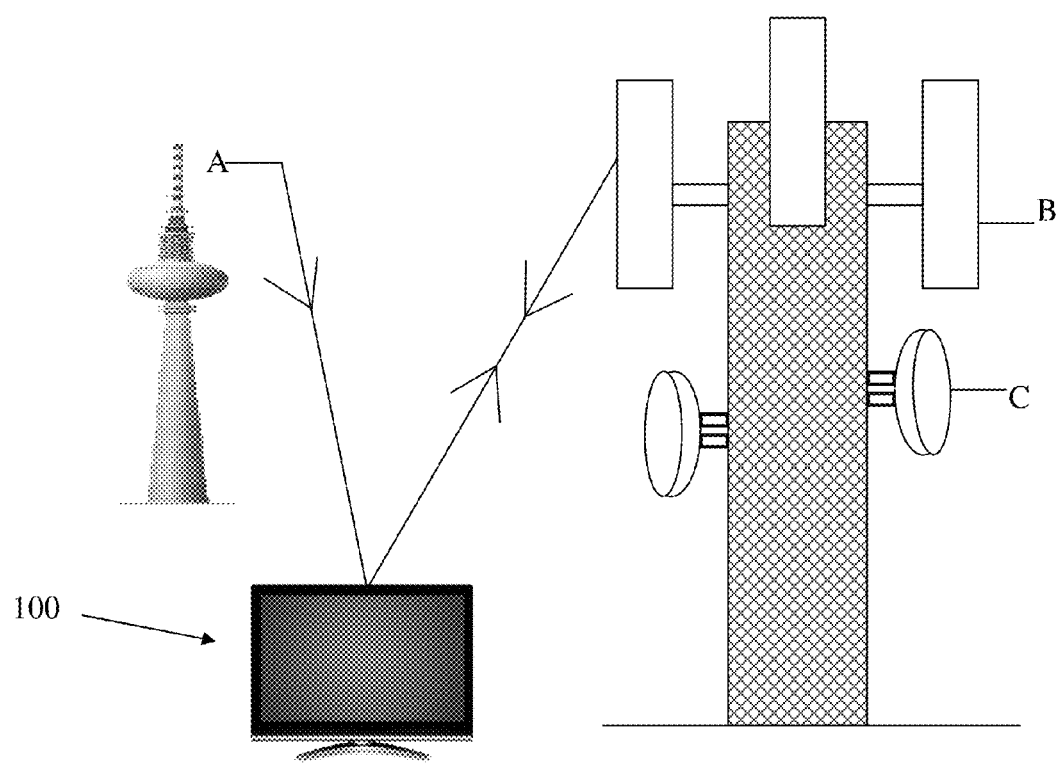
FIG. 1 shows a television capable of sending and/or receiving signals to and from television towers and mobile towers at the same time.

The FIG. 1 illustrates a television tower, a mobile tower and the television system 100 of the present invention. The television tower consists of a television antenna A. The mobile tower includes a service antenna B, such as a GSM (Global system for mobile communication) antenna, and a Microwave radio antenna C. The television system 100 may be capable of communicating with both the television tower and the mobile tower, and therefore may be considered to include a mobile phone.

In use, as can be seen from FIG. 1, when a user is listening to the audio of the television, such as may be associated with signal transmitted from the television tower, in the case of the user receiving a telephone call through the mobile service provider, such as may be associated with signal transmitted from the mobile tower, then an alert, such as a beep sound, may indicate the incoming call. The phone number associated with the incoming call (i.e. through the mobile service provider) may be displayed on the display screen (10) in the television system. This television system 100 may comprise an LCD television, an LED television, a Plasma television or other types of television systems. The user may then disable or hold the audio of the television, or the television system may automatically disable or hold the audio of the television, and the user may accept the call through the mobile service provider. After the telephone call is over, then the user may reactivate the audio of television, or the television system may automatically reactivate the audio.

Figure 2:
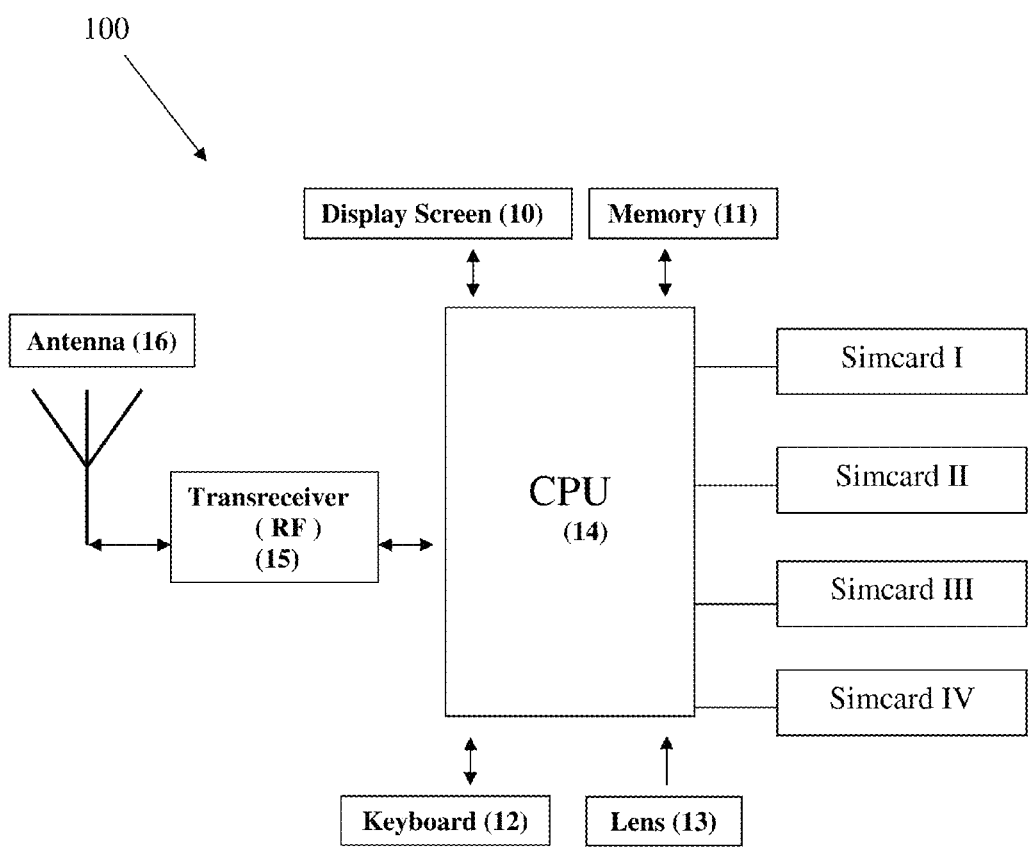
FIG. 2 shows a schematic diagram of the television or television system of the present invention.

As can be seen in FIG. 2, the television system 100 including a mobile phone may comprise a Display Screen (10), Keyboard (12) and/or Virtual Keyboard (12), Lens (13), Memory (11), CPU (14), Transreceiver (15), Antenna (16), and Simcards (I, II, III, IV).

The Display Screen (10) may be connected to the CPU (Central Processing Unit) (14) for displaying characters, messages, pictures, videos or other information associated with the television system 100 that may be received from a television tower. The Display screen (10) may be LCD (Liquid Crystal Display), LED (Light Emitting Diode) display screen, plasma screen, or any other type of screen. In addition, the Display Screen (10) may also be used for displaying information associated with a telephone call, such as may be received from the mobile tower. This may include a Caller ID number, location of a call, identity of a caller, characters (or) messages, pictures, videos, Menu, SMS messages, MMS messages, FAX transmissions, E-mails, etc. The Display Screen (10) may also be used for dialing phone numbers, or inputting information by the user, including using numbers, the alphabets, and abbreviations. The menu may be shown to the user in words (alphabets, numbers) or abbreviations on the Display Screen (10).

The Keyboard (12) and/or Virtual Keyboard (12) may be connected to the CPU (14) for inputting data like letters and numbers. The Keyboard (12) and/or Virtual Keyboard (12) may have keys from numbers '0' to '9' and also may have keys including the alphabets from 'a' to 'z.' In one embodiment, the keys may include both letters and numbers, such as the case wherein the key with no. 2 also includes the alphabets 'a, b, c', the key with no. 3 also includes the alphabets 'd, e, f' and so on. Based on these arrangements of the keys in the Keyboard and/or Virtual Keyboard (12), the user may have the ability to dial any mobile or telephone number by operating the relevant keys on the Keyboard and/or Virtual Keyboard (12) or send SMS, MMS, FAX, E-mail, etc. by pressing a key. The keys on the Keyboard and/or Virtual Keyboard (12) may allow the user to operate various functions associated with the telephonic features of the television system 100, such as pressing 'm' to enter into the menu function.

The Lens (13) may be designed suitably and can be incorporated in any convenient part of television system 100. The operation of the lens (13) may be provided by appropriate keys, such as those associated with the Keyboard and/or Virtual Keyboard (12). The Lens (13) may also be connected to the Central Processing Unit (14) for sending signals thereto and receiving commands therefrom. The Lens (13) may be adapted to capture an image, such as an image of an object in proximity to the television system 100. The lens (13) may be manually operated and/or automatically operated to capture the image, and may capture images of objects at any distance from the television system 100.

The Memory (11) may be connected to the CPU (14) and can be used to read and write messages and for storing information. Program instructions for operating the features of the television system 100 may be stored in the Memory (11). The menu can be selected by pressing appropriate keys on the Keyboard and/or Virtual Keyboard and the related instructions of the program can be stored in the memory (11), to be viewed on the Display Screen (10). The menu may be shown to the user in words (alphabets, numbers) or abbreviations on the display screen (10).

The CPU (14) may be used to control the operation of the device. The CPU (14) may include several input and output pins for the various functions associated with the television system 100. For example, the CPU (14) may send commands to operate the LCD television, LED television, Plasma television and other television system. In one embodiment, the CPU (14) may include a plurality of CPUs that may be utilized to control the operation of the device. The simcards may include a plurality of simcards and may be connected to the CPU. In one aspect of the invention, the simcards may be connected in parallel. Information and/or signals from the simcards may be fed to the CPU (14) separately as shown in the FIG. 2. Additionally, an Antenna (16) and Transreceiver (15) may be connected to the CPU (14).

The Transreceiver (15) may be a radiofrequency (RF) transreceiver. In one aspect, there may be a plurality of transreceivers (15). The transreceiver (15) may be designed for transreceiving mobile signals to and from the mobile tower selectively and/or simultaneously.

The audio associated with a mobile telephone call may be heard through speakers and/or headphone/earphone jack and/or bluetooth in the television system 100. Audio associated with the television features of the television system 100 may also be heard through speakers and/or headphone/earphone jack and/or bluetooth in the television system 100.

In one embodiment, one, some, or all the features of mobile phone can be operated by the CPU (14). These features may include the keyboard and/or Virtual Keyboard, one or a plurality of simsocket or simcards, the Display screen, the transreceivers, video, audio, bluetooth, radio, camera, speakers, memory socket, fax, audio call, video call, WAP, Wi-Fi, Wi-Fi Hotspot, GPRS, and any other mobile telephone feature. The CPU (14) may operate these features independently or concurrently.

The power supply required to operate the mobile phone may be obtained from a battery and/or external power supply. The external power supply may be obtained by providing an external socket which may be fixed in the television system.

Figure 3:
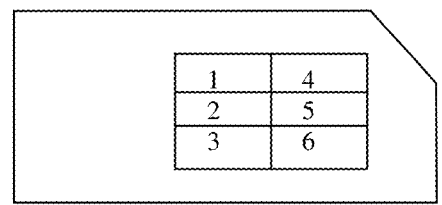
FIG. 3 shows the details of the pins of a simcard.
Figure 4:
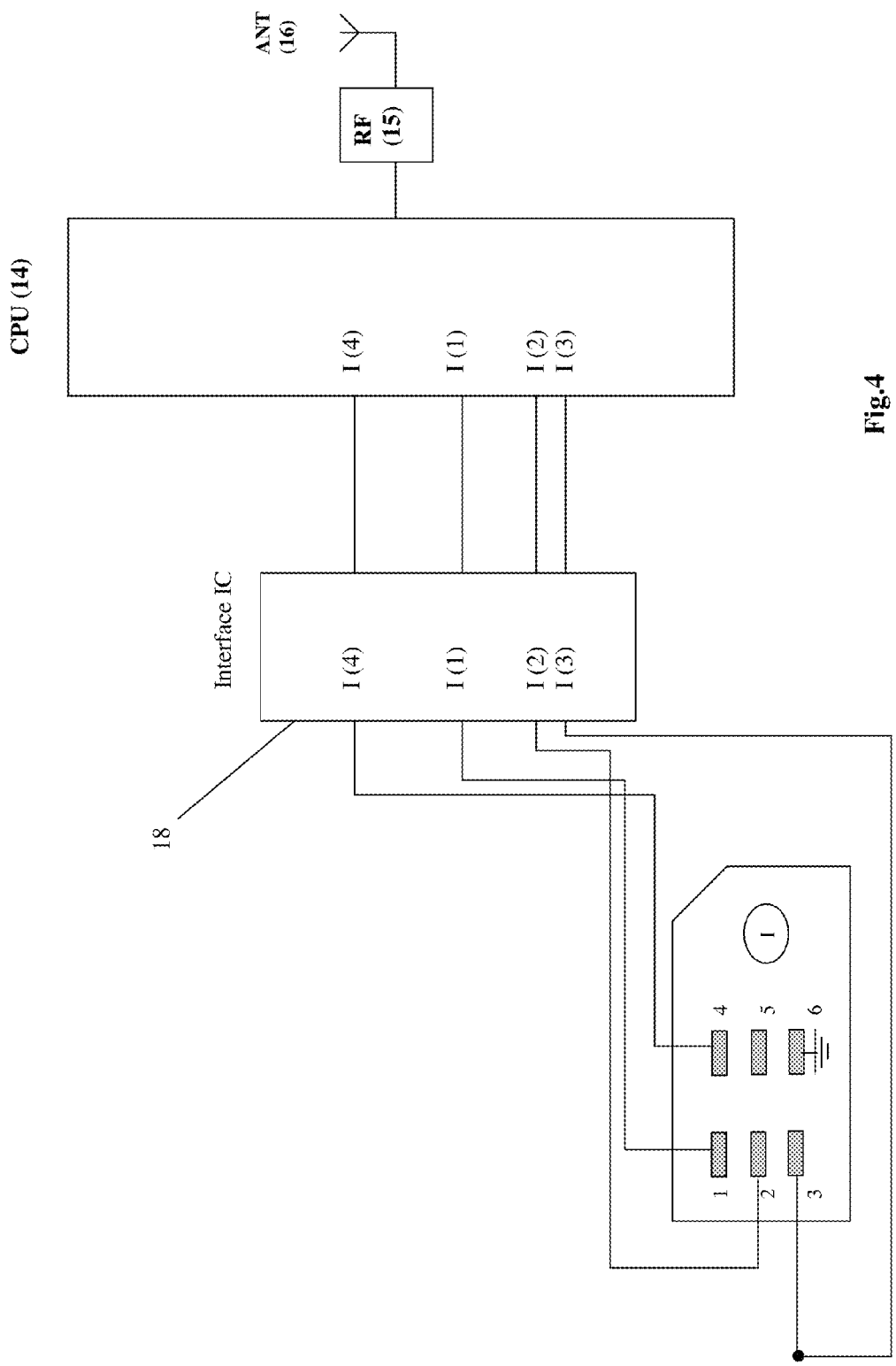
FIG. 4 shows the circuitry of the system having one simcard.
Figure 5:
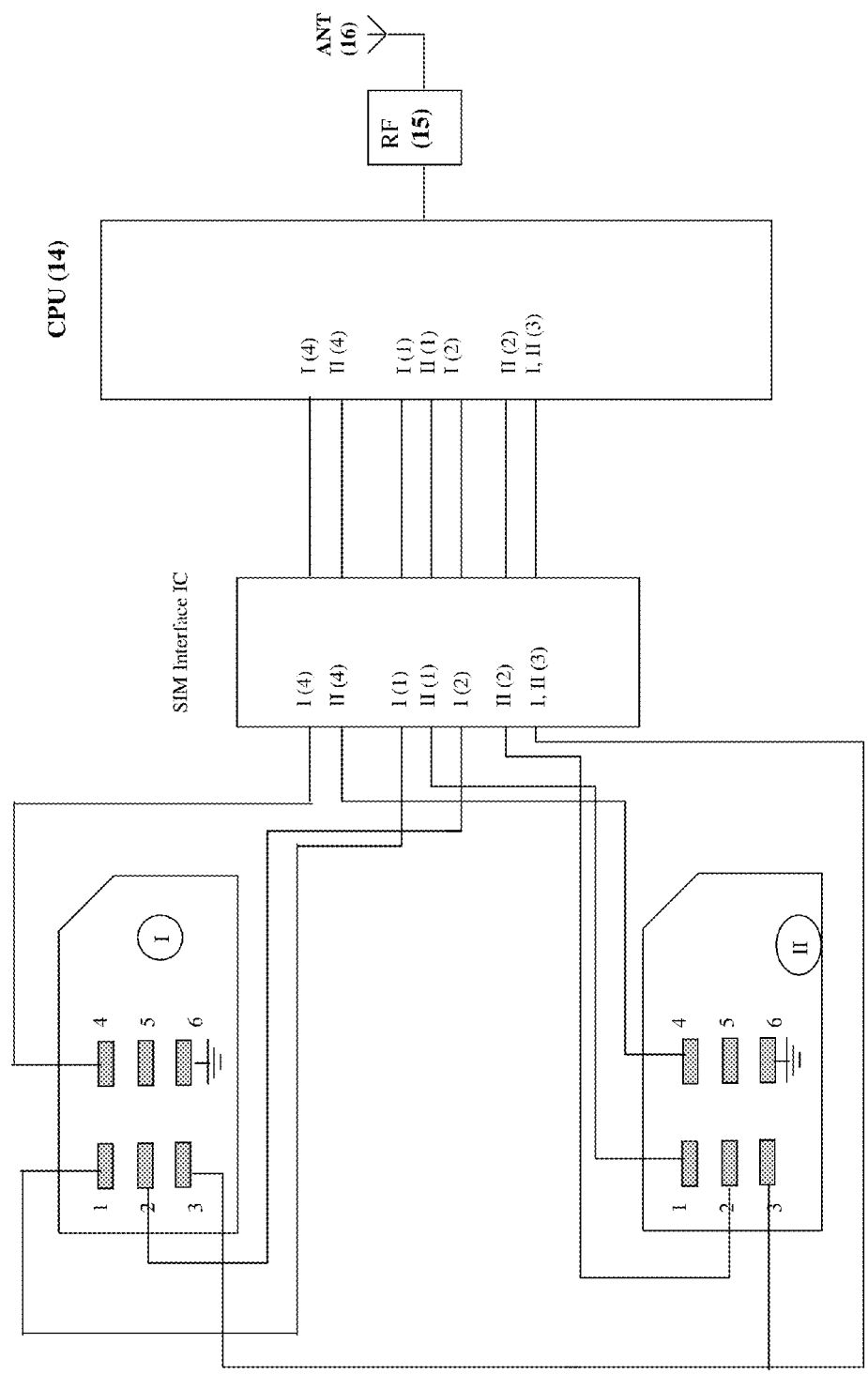
FIG. 5 shows the circuitry of the system having two simcards.
Figure 6:
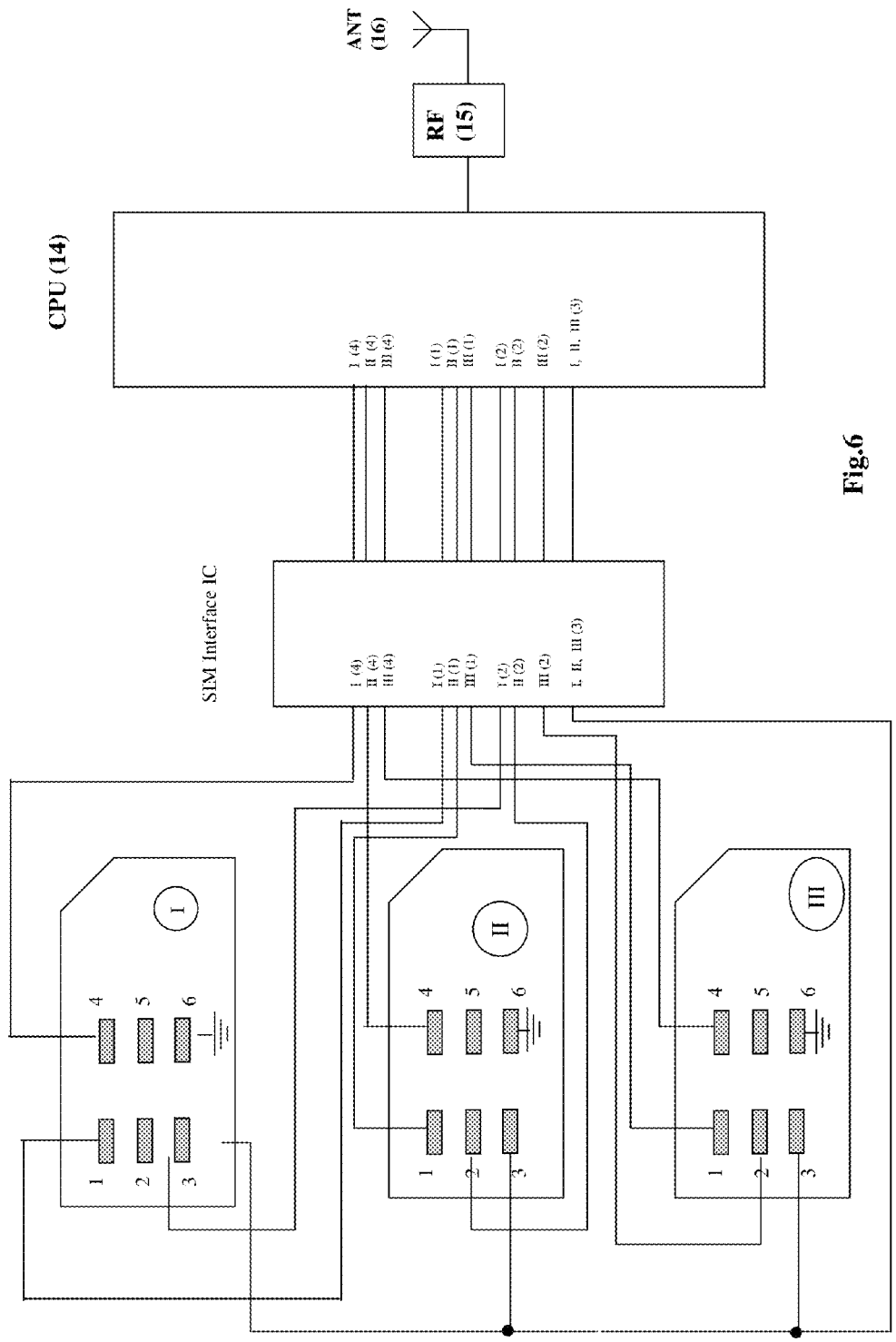
FIG. 6 shows the circuitry of the system having three simcards.
Figure 7:
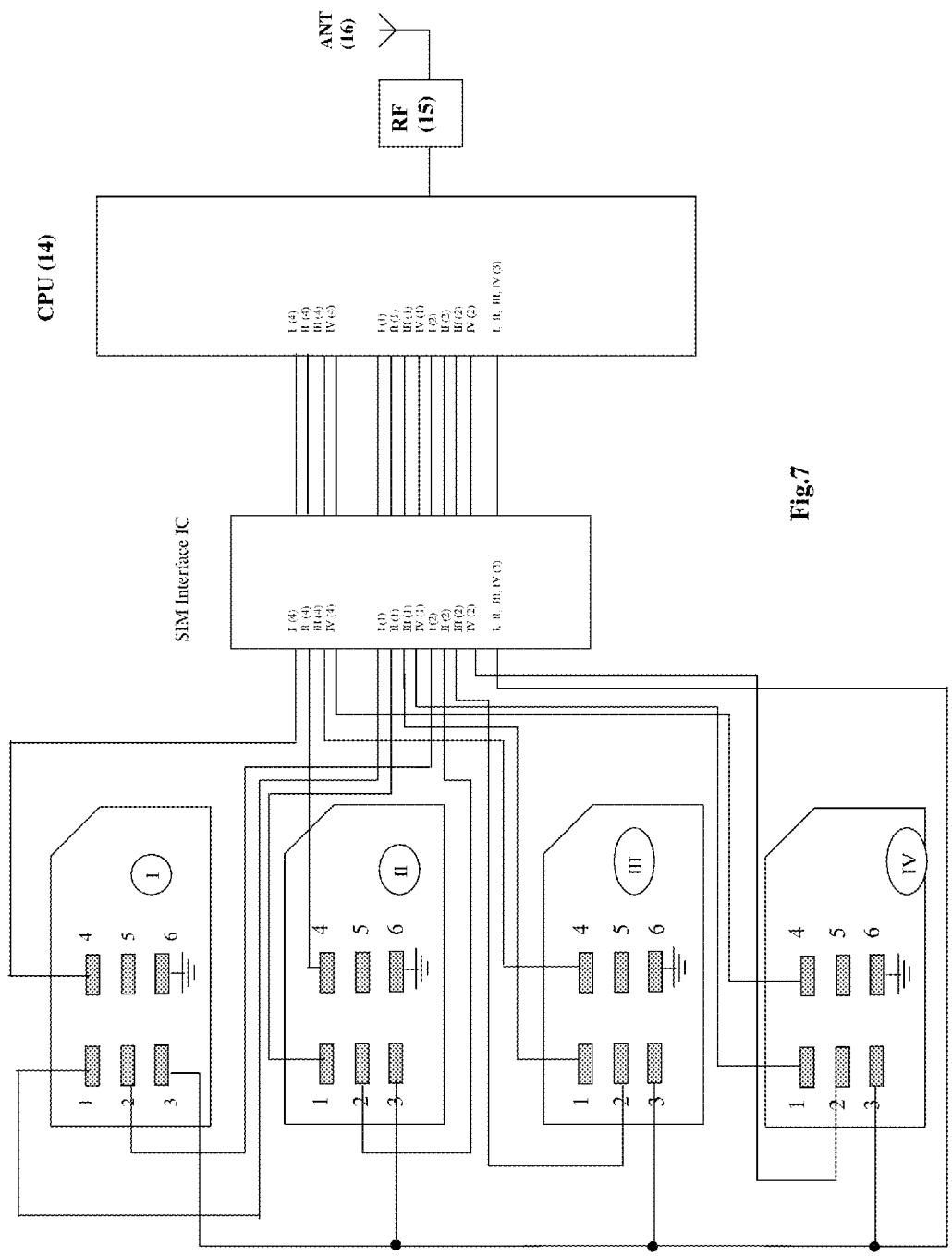
FIG. 7 shows the circuitry of the system having four simcards.

As can be seen in FIG. 3, a SIMcard (Subscriber Identity Module) associated with the television system 100 may include a plurality of pins. FIG. 3 illustrates a simcard with six pins. In the context of the television system of the present invention, the simcards may be connected in parallel. The pin details of the simcard of FIG. 3 are as follows, 1) CLOCK
2) RESET
3) POWER SUPPLY (Vcc)
4) I/O (DATA)
5) NC (NO CONNECTION)
6) GROUND FIGS. 4-7 illustrate various embodiments of the connections of the simcards. Each embodiment illustrates one or more simcards I, II, III, IV, a SIM IC or SIM Interface IC 18, a CPU (14), a transreceiver (15) and an antenna (16).

The power supplied for the simcards may emanate from the same source, and therefore the power supply (Vcc) may be common to all the simcards. The Vcc of individual simcards may be interconnected before it is fed to the Interface IC as shown in the FIGS. 4-7. The ground pin (6) of the individual simcards may be interconnected and may be commonly grounded. The "no connection" pin (5) may not be connected to the television system. The clock signal (1) from the individual simcards (simcard I, simcard II, simcard III, and simcard IV) may be connected to the sim interface IC (18) separately (clk I, clk II etc.). The Input/Output (I/O) data (4) and Reset output (2) from each of the simcards (I, II, etc.) may also be fed to the sim interface IC (18) separately as shown. The signals from the various simcards may be fed to the CPU (14) through the sim interface IC (18). The CPU (14) may also be connected to the transreceivers (15) and through to the Antenna (16). The transreceivers (15) may be adapted for transreceiving signal to/from a plurality of mobile towers selectively and/or simultaneously.

A switching circuit may be placed between the sim interface IC (18) and the CPU (14). In one aspect, the switching circuit may be a 'chip' (i.e. an Integrated Circuit device (IC)) and can be placed between the simcards and CPU (14). The timing of switching may be milliseconds, nanoseconds, or any other increment. By this method of switching among multiple simcards, signals from a plurality of different mobile companies' towers can be transreceived through RF (15).

In another aspect, the switching circuit may be placed between CPU (14) and the transreceiver (15). In this configuration as well, signal from a plurality of different mobile companies' towers can transreceived. The timing of switching may be the same between the switching of RF (15) and Simcard in either aspect.

According to the invention, a television system 100 comprising a mobile phone is disclosed, having one or a plurality of simsocket contains plurality of pins (which may include an Input/Output pin, clock pin, reset pin, vcc pin, ground pin, etc.). The said pins of the one or plurality of simsocket may be connected in parallel. The said plurality of simsocket may receive a plurality of simcards in order to operate selectively and/or simultaneously. The said plurality of simsocket may be connected to the CPU (14) in parallel and the said CPU (14) may include the switching circuit. The said CPU (14) may be connected to the one or plurality of simsocket through the switching circuit. The function of the one or plurality of simsocket may be operated by the CPU (14), the switching circuit, and the transreceivers (15).

The circuitry of the LCD television, LED television, Plasma television or other television of the television system 100 may be modified in order to accommodate utilization of the one or plurality of simsockets. These simsockets may be adapted for accepting the one or plurality of simcards, which are adapted to allow for transreceiving signal from one or more mobile towers. The function of the television and mobile phone may be operated selectively and/or simultaneously by the CPU (14), switching circuit, and transreceivers (15). The said CPU (14) may be connected through the transreceiver (15) to the antenna (16) in the television system.

The number of simcards included in the television system may determine the number of different mobile towers with which the television system may communicate. For instance, if one simcard is provided, then the television system may communicate one mobile tower of one mobile service provider. If two simcards are provided, then the television system may communicate two mobile towers, which may be associated with two different mobile service providers. If three simcards are provided, then the television system may communicate with three mobile towers, which may be of three different mobile service providers and so on. Therefore the television system may communicate with multiple numbers of mobile towers of various mobile service providers, depending on number of simcards provided in the television system.

The foregoing description of certain embodiments provides the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled. While the disclosure presents certain embodiments to illustrate the inventive concepts, numerous modifications, alterations, and changes to the described embodiments are possible without departing from the sphere and scope of the present invention. Accordingly, it is intended that the present disclosure not be limited to the described embodiments, but that it has the full scope defined by the language of the following claims, and equivalents thereof.

What is claimed is:

1. A television system comprising a television and a mobile phone for use in association with one or more mobile towers, wherein: a) the mobile phone includes one or a plurality of simsockets containing a plurality of pins, wherein an Input/Output pin, clock pin, reset pin, vcc pin, ground pin comprise pins of the simsocket, and the pins of the one or plurality of simsocket are connected in parallel, the plurality of simsocket adapted for accepting one or a plurality of simcards to operate said simcards selectively and/or simultaneously, and the plurality of simsocket connected in parallel to a central processing unit, the central processing unit having a switching circuit, the central processing unit connected to the one or plurality of simsocket through the switching circuit; b) the function of the one or plurality of simsockets is operated by the central processing unit, switching circuit, and a transreceiver; c) the television system includes circuitry comprising the one or plurality of simsockets for accepting the one or plurality of simcards, said circuitry adapted to transreceive signal from the mobile towers; d) the television and the mobile phone are operated selectively and/or simultaneously by the central processing unit, switching circuit, and transreceivers, and wherein the central processing unit is connected through the transreceivers to an antenna; e) the central processing unit comprises one or a plurality of central processing units in the television system; f) the mobile phone includes one or plurality of simsockets, and includes a plurality of features including any of a keyboard and/or Virtual Keyboard, Display screen, transreceivers, video, audio, bluetooth, radio, camera, speakers, memory socket, fax, audio call, video call, WAP, Wi-Fi, Wi-Fi Hotspot and GPRS, and wherein the mobile phone is operated by the central processing unit in the television system; and g) a power supply for operating the mobile phone comprises a battery and/or an external power supply in the television system.

2. The television system of claim 1, having one simsocket for accepting one simcard and wherein the function of the television and mobile phone is operated selectively and/or simultaneously by the central processing unit, switching circuit, and transreceiver.

3. The television system of claim 1, wherein, the mobile phone is adapted to operate on a GSM or CDMA network, and wherein the mobile phone is further adapted to operate on a 2G, 3G, 4G, 5G, or 6G network.

4. The television system of claim 1, wherein, the circuitry includes a plurality of simsockets for accepting a plurality of simcards adapted to transreceive signal from the mobile towers.

5. The television system of claim 4, wherein, the transreceiver is adapted to transreceive signal from a plurality of different mobile service provider towers by selectively and/or simultaneously the plurality of simsockets, wherein at least two of the plurality of simcards contain data of different mobile service providers.

6. The television system of claim 1, wherein, the television and mobile phone are operated selectively and/or simultaneously by the central processing unit, switching circuit, and transreceivers.

7. The television system of claim 1, wherein, the transreceiver is adapted to selectively and/or simultaneously transreceive the signals of mobile phone and television.

8. The television system of claim 1, wherein the television system is adapted to selectively and/or simultaneously transreceive signal from the antenna of mobile and television service providers.

9. The television system of claim 1, wherein, the display screen and/or keyboard of mobile phone is adapted to be displayed or viewed on the display screen of the television system.

10. The television system of claim 1, further including speakers and/or headphone/earphone jack and/or Bluetooth, and wherein the speakers and/or headphone/earphone jack and/or Bluetooth are adapted to transmit the audio of the mobile phone.

* * * * *